United States Patent
Kim et al.

(10) Patent No.: US 9,860,011 B2
(45) Date of Patent: Jan. 2, 2018

(54) METHOD AND APPARATUS FOR SELECTING WAVELENGTH IN HYBRID PASSIVE OPTICAL NETWORK SYSTEM

(71) Applicant: ELECTRONICS AND TELECOMMUNICATIONS RESEARCH INSTITUTE, Daejeon (KR)

(72) Inventors: Geun Yong Kim, Gwangju (KR); Hark Yoo, Gwangju (KR); Sung Chang Kim, Gwangju (KR); Dong Soo Lee, Seongnam (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/173,436

(22) Filed: Jun. 3, 2016

(65) Prior Publication Data

US 2016/0373207 A1 Dec. 22, 2016

(30) Foreign Application Priority Data

Jun. 19, 2015 (KR) .................. 10-2015-0087748

(51) Int. Cl.
| | |
|---|---|
| H04J 14/02 | (2006.01) |
| H04L 7/00 | (2006.01) |
| H04J 14/08 | (2006.01) |
| H04B 10/27 | (2013.01) |

(52) U.S. Cl.
CPC ...... *H04J 14/0227* (2013.01); *H04J 14/0282* (2013.01); *H04L 7/0075* (2013.01)

(58) Field of Classification Search
USPC ........................... 398/68, 66, 64, 63
See application file for complete search history.

(56) References Cited

U.S. PATENT DOCUMENTS

| | | | |
|---|---|---|---|
| 9,397,778 B2* | 7/2016 | Lee | H04J 14/023 |
| 2009/0154939 A1 | 6/2009 | Kim et al. | |
| 2012/0328287 A1* | 12/2012 | Grosso | H04J 14/0282 398/34 |
| 2014/0219661 A1* | 8/2014 | Doo | H04J 14/0227 398/68 |
| 2015/0055957 A1 | 2/2015 | Lee et al. | |
| 2015/0098704 A1* | 4/2015 | Gao | H04J 14/0246 398/68 |
| 2016/0285555 A1* | 9/2016 | Wu | H04B 10/27 |
| 2016/0344472 A1* | 11/2016 | Geng | H04B 10/032 |
| 2016/0373207 A1* | 12/2016 | Kim | H04J 14/0282 |

FOREIGN PATENT DOCUMENTS

KR 10-2015-0024279 A 3/2015

* cited by examiner

*Primary Examiner* — Oommen Jacob

(57) ABSTRACT

Disclosed is a method and an apparatus for selecting a wavelength in a hybrid Passive Optical Network (PON) system. The method of selecting a wavelength by a wavelength selecting apparatus in a hybrid passive optical network system includes: performing synchronization with any one of a plurality of downstream wavelengths; when the synchronization is succeeded, determining whether to select the synchronized downstream wavelength for a registration to an optical line terminal; and when it is determined to select the synchronized downstream wavelength, performing the registration to the optical line terminal through the synchronized downstream wavelength.

11 Claims, 5 Drawing Sheets

| Octet | Content | Description |
|---|---|---|
| 1-2 | ONU-ID | 0x3FF, Broadcast ONU-ID |
| 3 | 0x18 | Message type ID "Channel_Prifile" |

⋮

| 26 | DWLCH_ID_SYNC | Downstream wavelength ID to be synchronized |
| 27 | Padding | Set to 0x00 by the transmitter; treated as "don't care" by the receiver. |
| 28 | MIC | Message integrity check, computed using the default PLOAM integrity key |

| Octet | Content | Description |
|---|---|---|
| 1-2 | ONU-ID | 0x3FF, Broadcast ONU-ID |
| 3 | 0x18 | Message type ID "Channel_Prifile" |

⋮

| 26 | THIS_DWLCH_PRS | Purpose of this downstream wavelength ID |
| 27 | Padding | Set to 0x00 by the transmitter; treated as "don't care" by the receiver. |
| 28 | MIC | Message integrity check, computed using the default PLOAM integrity key |

METHOD AND APPARATUS FOR SELECTING WAVELENGTH IN HYBRID PASSIVE OPTICAL NETWORK SYSTEM

CROSS-REFERENCE TO RELATED APPLICATION

The present application claims priority to Korean patent application number 10-2015-0087748 filed on Jun. 19, 2015, the entire disclosure of which is herein incorporated by reference in its entirety.

BACKGROUND

1. Field

The present disclosure relates to a method and an apparatus for selecting a wavelength in a hybrid Passive Optical Network (PON) system.

2. Description of the Related Art

In the NG-PON2 standard, a wavelength change procedure in the TWDM-PON system is standardized, and a time taken for changing a wavelength is related to performance of an optical module of the ONU. By contrast, in the NG-PON2 standard, a standard indicating the kind of downstream wavelength among the downstream wavelengths transmitted by a Channel Termination (CT) of an Optical line Terminal (OLT), which is to be used during an initial bring-up (during the first registration to the OLT) of the ONU is not regulated. Accordingly, when the ONU frequently changes the wavelength during the initial bring-up, a traffic quality may be degraded, such as an increase in a delay time of a user packet. Further, the frequent wavelength change during an operation may increase a probability of an erroneous operation of the optical module of the ONU, so that it is important to minimize the number of times of the change of the wavelength.

SUMMARY

The present disclosure has been made in an effort to solve the above-described problems associated with the prior art, and provides a method and an apparatus for selecting a downstream wavelength when an Optical Network Unit (ONU) is initially registered in a hybrid Positive Optical Network (PON) system, such as a TWDM-PON system, including a wavelength tunable ONU.

An exemplary embodiment of the present disclosure provides a method of selecting a wavelength by a wavelength selecting apparatus in a hybrid passive optical network system, the method including: performing synchronization with any one of a plurality of downstream wavelengths; when the synchronization is succeeded, determining whether to select the synchronized downstream wavelength for a registration to an optical line terminal; and when it is determined to select the synchronized downstream wavelength, performing the registration to the optical line terminal through the synchronized downstream wavelength.

Another exemplary embodiment of the present disclosure provides an apparatus for selecting a wavelength operated in a hybrid passive optical network system, the apparatus including: a communication unit configured to perform communication with an optical line terminal; a control unit configured to control so as to perform synchronization with any one of a plurality of downstream wavelengths, determine whether to select the synchronized downstream wavelength for a registration to the optical line terminal when the synchronization is succeeded, and perform the registration to the optical line terminal through the synchronized downstream wavelength when it is determined to select the synchronized downstream wavelength; and a storage unit configured to store a wavelength related parameter obtained during the synchronization.

According to the method and the apparatus for selecting a wavelength according to the present disclosure, it is possible to decrease a wavelength selecting time and decrease the number of times of changing a wavelength during the performance of the load balancing in the hybrid PON system.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF THE INVENTION

Figure 1:
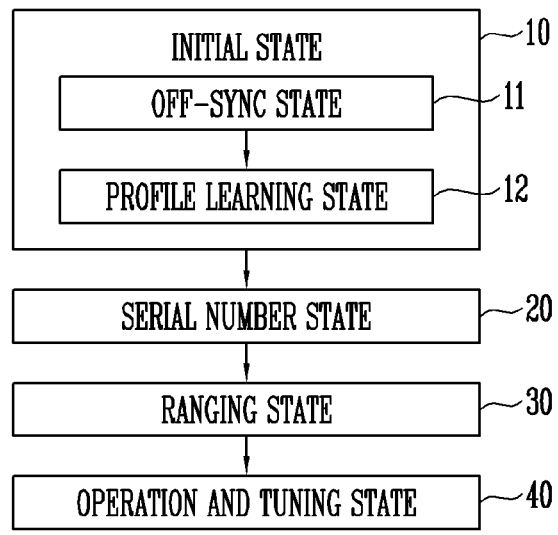
FIG. 1 is a diagram illustrating a state transition of a wavelength selecting apparatus in a hybrid PON system.

The present disclosure relates to a hybrid Passive Optical Network (PON), and more particularly, to a method and an apparatus for selecting a wavelength in a hybrid PON system including an Optical Line Terminal (OLT) and an Optical Network Unit (ONU) having a wavelength tunable function, such as a Time and Wavelength Division Multiplexing Passive Optical Network (TWDM-PON) system.

A wavelength selecting apparatus, which is the term used in the present specification, is an apparatus capable of selecting and changing a wavelength in a hybrid PON system, and may include, for example, an ONU. The wavelength selecting apparatus may be mixedly used with a wavelength tuning apparatus and an ONU, and may be interpreted as the same or similar meaning with a wavelength tuning apparatus and an ONU.

In the following description of the exemplary embodiment, when it is determined that a detailed description of known configurations and functions incorporated herein make the subject matter be obscure, the detailed description will be omitted.

In the case where a component is referred to as being "connected" or "accessed" to other component, it should be understood that not only the component is directly connected or accessed to the other component, but also there may exist another component between them.

The expressions, "include", "may include", and the like usable in an exemplary embodiment of the present disclosure indicate existence of a disclosed corresponding function, operation, element, and the like, and do not limit additional one or more functions, operations, elements, and the like. In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Further, the singular forms used in the present specification include the plural forms, unless the context clearly indicates otherwise.

Hereinafter, the present disclosure will be described with reference to the accompanying drawings.

According to development of an optical communication technology and a sharp increase in demands for the Internet service, basic research on an optical network has been conducted from the early 2000's. As a result, an introduction of a broadband access network, such as Fiber To The Home (FTTH) and Fiber To The Office (FTTO), which directly connects an office or a Central Office (CO) with a subscriber through the optical fibers, is generalized. Along with this, in order to handle an explosive increase in traffic according to a spread of a mobile IP terminal, such as a smart phone or a tablet computer, commercialization of an IPTV service, and a spread of multimedia broadcasting/streaming service through the Internet, research on a technology for a next generation ultrahigh-speed high-capacity optical network has been recently conducted.

In order to efficiently provide a service to more subscribers with a limited network resource, a Time Division Multiplexing (TDM) scheme and a Wavelength Division Multiplexing (WDM) scheme are applied to the optical network technology. Further, recently, research on an optical network, to which a hybrid scheme, in which the TDM scheme is combined with the WDM scheme, is applicable, has been conducted.

The optical network technology in the hybrid scheme has an advantage in that it is possible to respond to a continuous demand for an expansion of a bandwidth of a network, it is possible to provide more subscribers with an ultrahigh speed communication service, and it is easy to increase communication capacity and expand subscribers. Accordingly, the hybrid scheme has been widely researched as a candidate for a next generation optical network technology after the passive optical network in the 10 G glass.

The International Telecommunications Union-Telecommunication (ITU-T), which is the main international standardization group, selects the PON (Time and Wavelength Division Multiplexing Passive Optical Network (TWDM)-PON) technology in the time and wavelength division multiplexing scheme and the point-to-point WDM technology as the main hybrid optical network technology of the Next Generation-Passive Optical Network2 (NG-PON2) system, which is the next generation optical network system in the 40 G glass, and progresses the standardization task.

The optical network system using the TWDM-PON technology (TWDM-PON system) uses an Optical Network Unit (ONU) including a wavelength tunable light source. Accordingly, in the TWDM-PON system, upstream and downstream transception wavelengths of the ONU are not fixed and are changed as necessary, so that it is possible to evenly maintain (load balancing) a bandwidth load between channels. Further, in the TWDM-PON system, when the total amount of bandwidths used of the network is small, some of the channels may be transited to a power saving mode, and the channels of the ONUs using the corresponding channel may be changed to channels of other wavelengths. In addition, in the TWDM-PON system, when a problem is generated in an Optical Distribution Network (ODN), used wavelengths of the ONUs may be changed for the protection and the switching.

In the NG-PON2 standard, a wavelength change procedure in the TWDM-PON system is standardized, and a time taken for changing a wavelength is related to performance of an optical module of the ONU. By contrast, in the NG-PON2 standard, a standard indicating the kind of downstream wavelength among the downstream wavelengths transmitted by a Channel Termination (CT) of an Optical line Terminal (OLT), which is to be used during an initial bring-up (during the first registration to the OLT) of the ONU is not regulated. Accordingly, when the ONU frequently changes the wavelength during the initial bring-up, a traffic quality may be degraded, such as an increase in a delay time of a user packet. Further, the frequent wavelength change during an operation may increase a probability of an erroneous operation of the optical module of the ONU, so that it is important to minimize the number of times of the change of the wavelength.

FIG. 1 is a diagram illustrating a state transition of a wavelength selecting apparatus in a hybrid PON system. In FIG. 1, the hybrid PON system may be a Next Generation-Passive Optical Network2 (NG-PON2) system, which is the ITU-T standard in the TWDM-PON scheme. Further, the wavelength selecting apparatus in FIG. 1 may be an ONU under the NG-PON2 standard. FIG. 1 illustrates only a state part related to the present disclosure, and other state transitions will refer to the NG-PON2 standard.

Referring to FIG. 1, the wavelength selecting apparatus, of which power is turned on or which receives an initialization command, is operated in an initial state 10. The wavelength selecting apparatus may be operated in an Off-Sync state 11 from the initial state 10. The wavelength selecting apparatus selects a predetermined wavelength (channel, signal) in the Off-Sync state 11, and performs a downstream wavelength synchronization of obtaining an effective physical synchronization signal or a frame synchronization signal from a downstream wavelength transmitted from the OLT by calibrating an optical transceiver.

Through the downstream wavelength synchronization, the wavelength selecting apparatus may achieve the physical synchronization with the OLT.

When the downstream wavelength synchronization is succeeded, the wavelength selecting apparatus is transited to a profile learning state 12, receives a profile Physical Layer Operation, Administration and Maintenance (PLOAM) message, and obtains identification information on the selected wavelength, link use rate information, service operator information, and the like from the PLOAM message. The wavelength selecting apparatus may determine whether the selected wavelength is its service wavelength, whether there are many other wavelength selecting apparatuses using the corresponding wavelength, and the like based on the identification information, the link use rate information, and the service operator information, and may determine whether to progress the registration to the OLT at the selected wavelength.

When it is determined not to progress the registration at the corresponding wavelength, the wavelength selecting apparatus may be transited to the Off-sync state 11 again. When it is determined to progress the registration at the corresponding wavelength, the wavelength selecting apparatus may be transited to an operating & turning state 40 by sequentially passing through a serial number state 20 and a ranging state 30. The wavelength selecting apparatus, which is transited to the operating and tuning state 40, is completely registered to the OLT. In the state transition diagram of FIG. 1, the operating and tuning state 40 may include a process, in which the wavelength selecting apparatus is state-transited according to the PLOAM message, which the OLT transmits for changing the wavelength.

The aforementioned process is a process of registering the wavelength selecting apparatus to the OLT, and may be called a bring-up process.

Figure 2:
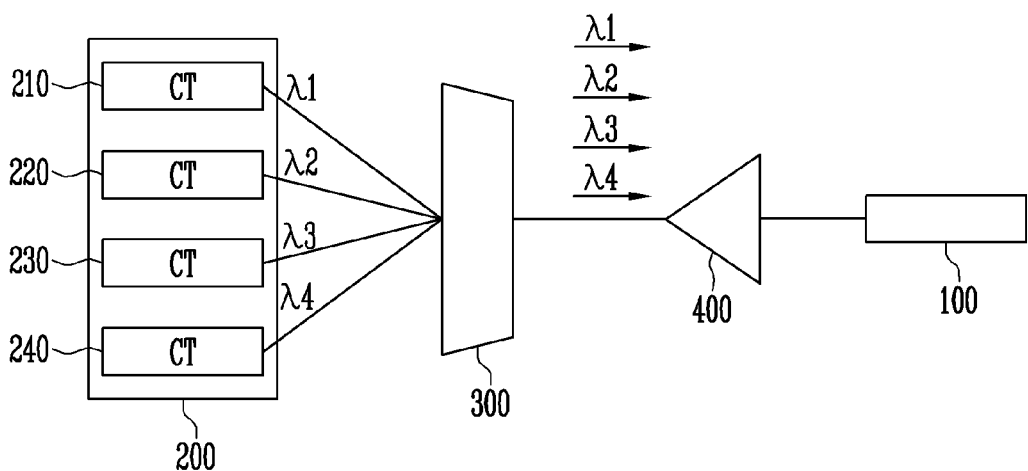
FIG. 2 is a diagram for describing a selection of a wavelength by the wavelength selecting apparatus in the hybrid PON system.

FIG. 2 is a diagram for describing a selection of a wavelength by the wavelength selecting apparatus in the hybrid PON system.

Referring to FIG. 2, an OLT 200 includes one or more CTs 210 to 240. A downstream wavelength used by each of the CTs 210 to 240 is multiplexed by a Multiplexer (MUX) 300, and is transmitted to a wavelength selecting apparatus 100 via an optical power splitter 400.

According to the NG-PON2 standard, when the ONU 100 is initially registered to the OLT 200, the ONU 100 attempts to perform synchronization with any one of one or more downstream wavelengths transmitted by the OLT 200 by controlling the optical transceiver. When the synchronization is first succeeded for the predetermined downstream wavelength, the ONU 100 stores optical module control parameters (wavelength related parameters) when the synchronization is succeeded, and progresses the registration to the OLT 200. The aforementioned process may be stopped or continued according to a policy of the ONU 100. When the downstream wavelength to be used for the registration is determined as described above, an upstream wavelength is also determined through the PLOAM message transmitted through the determined downstream wavelength.

The kind of wavelength, which is to be used by the ONU 100 for the registration during the synchronization process, among the one or more wavelengths is not defined in the standard. Accordingly, the present disclosure provides a method and the apparatus for selecting a wavelength, which are capable of selectively changing a wavelength while minimizing a wavelength selection time and the number of times of changing the wavelength in the hybrid PON system.

Figure 3:
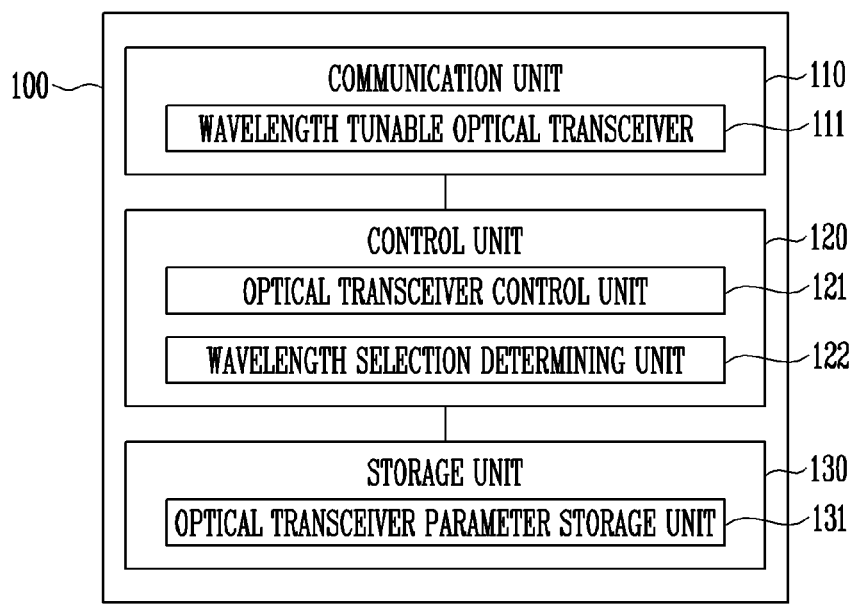
FIG. 3 is a block diagram illustrating a structure of a wavelength selecting apparatus according to the present disclosure.

FIG. 3 is a block diagram illustrating a structure of the wavelength selecting apparatus according to the present disclosure.

Referring to FIG. 3, the wavelength selecting apparatus 100 according to the present disclosure may include a communication unit (transceiver) 110, a control unit (controller) 120, and a storage unit 130.

The communication unit 110 transceives data for communication with the outside. In the wavelength selecting apparatus 100 according to the present disclosure, the communication unit 110 may be a wavelength tunable optical transceiver 111 or may include the wavelength tunable optical transceiver 111. The wavelength tunable optical transceiver 111 may perform communication according to a data modulation and transception scheme corresponding to the wavelength selected by the control unit 120.

The control unit 120 controls each of the constituent elements of the wavelength selecting apparatus 100 in order to perform the wavelength selecting method according to the present disclosure. Particularly, the control unit 120 receives a plurality of downstream wavelengths by controlling the communication unit 110, and performs the synchronization with any one of the plurality of received downstream wavelengths. To this end, the control unit 120 may include an optical transceiver control unit 121 controlling the communication unit 110 (the wavelength tunable optical transceiver 111). In the exemplary embodiment of the present disclosure, the control unit 120 may select any one of the plurality of downstream wavelengths received through the communication unit 110. To this end, the control unit 120 may include a wavelength selection determining unit 122.

The storage unit 130 stores various elements of information required for selecting a wavelength under the control of the control unit 120. Particularly, the storage unit 130 may temporarily or permanently store a parameter (optical receiver parameter) about a predetermined wavelength, and to this end, the storage unit 130 may include an optical transceiver parameter storage unit 131.

The constituent elements may be implemented by hardware, a microprocessor, or software including an ONU Media Access Control (MAC) chip.

Hereinafter, the wavelength selecting method according to the present disclosure by the wavelength selecting apparatus 100 will be described in more detail.

Figure 4:
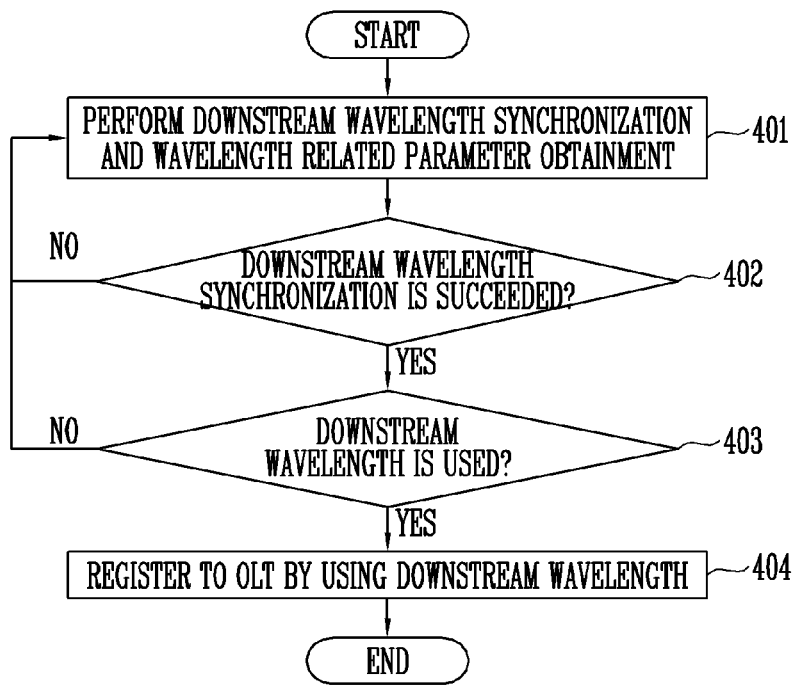
FIG. 4 is a flowchart illustrating an Optical Line Terminal (OLT) registering method according to the present disclosure.

FIG. 4 is a flowchart illustrating an Optical Line Terminal (OLT) registering method according to the present disclosure.

Referring to FIG. 4, at an early stage of the bring-up process, the wavelength selecting apparatus 100 first synchronizes a downstream wavelength and obtains a wavelength related parameter (401). The wavelength selecting apparatus 100 performs the synchronization with any one of a plurality of downstream wavelengths transmitted from the OLT 200 by controlling the wavelength tunable optical transceiver 111 through the optical transceiver control unit 121. In this case, the wavelength selecting apparatus 100 may obtain a wavelength related parameter about the synchronized wavelength.

When the downstream wavelength synchronization is failed (402), the wavelength selecting apparatus 100 may repeat the aforementioned process.

When the downstream wavelength synchronization is succeeded (402), the wavelength selecting apparatus 100 determines whether to continue the registration to the OLT 200 by using the synchronized wavelength (downstream wavelength) (403). That is, the wavelength selecting apparatus 100 may determine whether to terminate the synchronization with the downstream wavelength and the obtainment of the wavelength related parameter and perform the bring-up with the synchronized wavelength, or whether to perform the synchronization with the downstream wavelength and the obtainment of the wavelength related parameter again and select another synchronized wavelength through the wavelength selection determining unit 122.

In various exemplary embodiments of the present disclosure, the wavelength selecting apparatus 100 may determine whether to use the synchronized wavelength by using at least one of a dynamic wavelength provisioning method, a random selection method, and an early synchronization and change method. In various exemplary embodiments of the present disclosure, the wavelength selecting apparatus 100 may use one of the three wavelength selecting methods, or may selectively use the three wavelength selecting methods while changing the three wavelength selecting methods. The three wavelength selecting methods will be described below.

When it is determined not to use the synchronized wavelength, the wavelength selecting apparatus 100 returns to the synchronization with the downstream wavelength and the obtainment of the wavelength related parameter, and repeats the operations.

When it is determined to use the synchronized wavelength, the wavelength selecting apparatus 100 terminates the repetition of the operations, performs the bring-up process by using the synchronized wavelength, and performs the registration to the OLT 200 (404). The feature that the wavelength selecting apparatus 100 determines to use the synchronized wavelength, and continuously performs the registration to the OLT 200 with the corresponding wavelength means that the wavelength selecting apparatus 100 selects the corresponding wavelength during the bring-up process.

Hereinafter, as a method of selecting a wavelength according to an exemplary embodiment of the present disclosure, the dynamic wavelength provisioning method, the random selection method, and the early synchronization and change method will be described in detail.

Figures 5, 6:
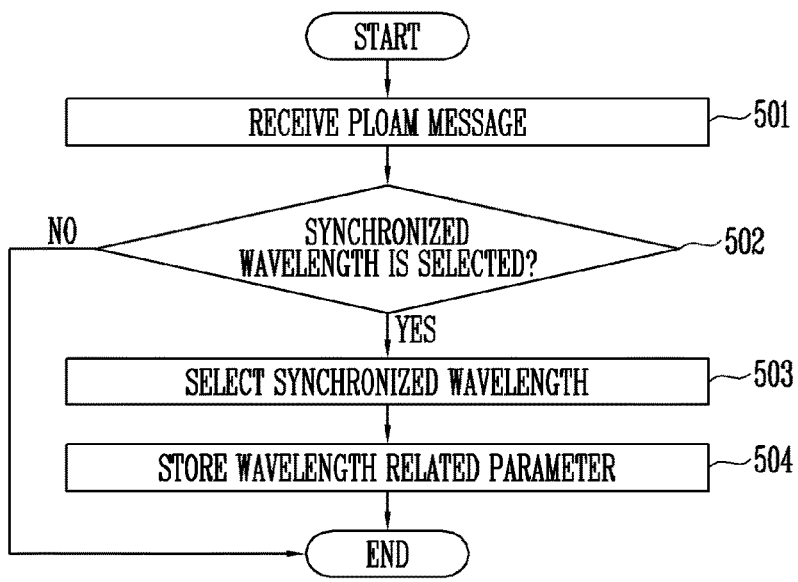
FIG. 5 is a flowchart illustrating a wavelength selecting method according to a first exemplary embodiment of the present disclosure.
FIG. 6 is a diagram illustrating an example of a Physical Layer Operation, Administration and Maintenance (PLOAM) message structure in the first exemplary embodiment of the present disclosure.

FIG. 5 is a flowchart illustrating a wavelength selecting method according to a first exemplary embodiment of the present disclosure. In the first exemplary embodiment of the present disclosure, the wavelength selecting apparatus 100 selects a wavelength according to the dynamic wavelength provisioning method.

The dynamic wavelength provisioning method is a method of enabling the wavelength selecting apparatus 100 to select a specified downstream wavelength by specifying and notifying a downstream wavelength, which is to be selected by the wavelength selecting apparatus 100, through a POLAM message (a channel information POLAM message) transmitted through the specific CT among the CTs 210 to 240 of the OLT 200. After the downstream wavelength synchronization is succeeded, the wavelength selecting apparatus 100 may analyze the information included in the PLOAM message periodically transmitted from the OLT 200, and determine whether to use the synchronized wavelength. To this end, the OLT 200 may insert information (hereinafter, wavelength selecting information) indicating whether a predetermined downstream wavelength is a wavelength to be used for the bring-up into the PLOAM message and transmit the PLOAM message. The information may be changed by the OLT 200.

According to the dynamic wavelength provisioning method, the OLT 200 is capable of determining a wavelength to be allocated to the specific wavelength selecting apparatus 100 in consideration of load balancing between one or more wavelengths, so that it is possible to minimize the number of times of changing the wavelength and a time taken for changing a wavelength for later load balancing.

Referring to FIG. 5, after the downstream wavelength synchronization is succeeded in FIG. 4, the wavelength selecting apparatus 100 receives the PLOAM message from the OLT 200 (501). The wavelength selecting apparatus 100 determines whether to select the synchronized wavelength based on the downstream wavelength information included in the received PLOAM message (502).

In various exemplary embodiments of the present disclosure, the PLOAM message may have a structure illustrated in FIG. 6. The PLOAM message illustrated in FIG. 6 has a structure modified from a Channel_Profile_PLAOM message under the NG-PON2 standard. In a case of the OLT 200 operated in the PON system under a standard, other than the NG-PON2, the OLT 200 may transmit various forms of messages including the wavelength selecting information to the wavelength selecting apparatus 100 according to a signaling method of the corresponding standard.

Referring to FIG. 6, in the PLOAM message, the wavelength selecting information may be included in DWLCH_ID_SYNC octet that is the $26^{th}$ field. When the wavelength selecting apparatus 100 receives the PLOAM message, the wavelength selecting apparatus 100 may compare a downstream wavelength ID obtained during the downstream wavelength synchronization process with a value of the DWLCH_ID_SYNC field, and when the two values are the same as each other, the wavelength selecting apparatus 100 may select the corresponding wavelength (503).

Figures 7, 8:
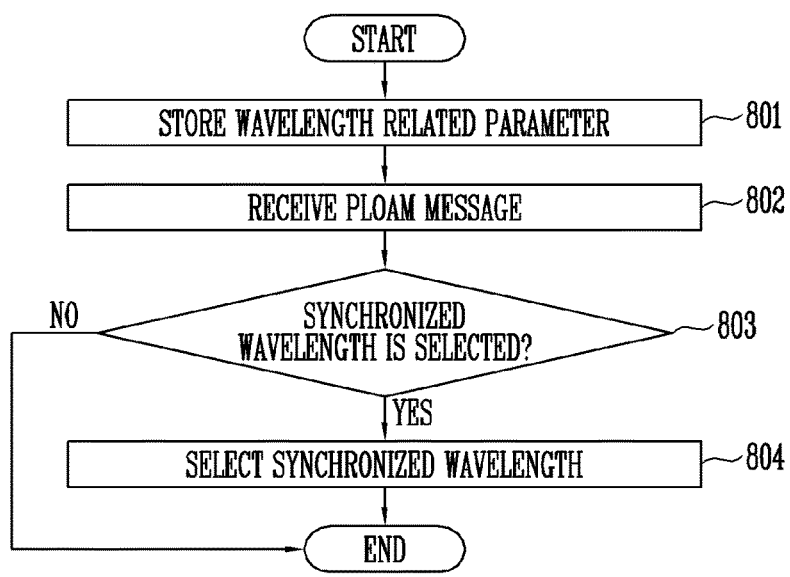
FIG. 7 is a diagram illustrating another example of a PLOAM message structure in the first exemplary embodiment of the present disclosure.
FIG. 8 is a flowchart illustrating a wavelength selecting method according to a second exemplary embodiment of the present disclosure.

Otherwise, in various exemplary embodiments of the present disclosure, the PLOAM message may have a structure illustrated in FIG. 7. Referring to FIG. 7, in the PLOAM message, the wavelength selecting information may be included in THIS_DWLCH_PRS that is the $26^{th}$ field. In this case, the wavelength selecting information may contain information indicating the kind of Service Level Agreement (SLA) supported by the currently synchronized downstream wavelength. In one example, when the value of the wavelength selecting information is 0, the currently synchronized downstream wavelength may be a wavelength supporting a general Internet service subscriber (residential customer), when the value of the wavelength selecting information is 1, the currently synchronized downstream wavelength may be a wavelength supporting a dedicated service subscriber (business customer), and when the value of the wavelength selecting information is 2, the currently synchronized downstream wavelength may be a wavelength supporting a wireless network backhaul. When the wavelength selecting apparatus 100 receives the PLOAM message, the wavelength selecting apparatus 100 may select the corresponding wavelength in a case where the value of the THIS_DWLCH_PRS field is a value corresponding to a service required by the wavelength selecting apparatus 100 (503).

When the PLOAM message has the structure illustrated in FIG. 7, the wavelength selecting apparatus 100 selects the wavelength according to the service required by the wavelength selecting apparatus 100 and is registered to the OLT 200, so that there is an advantage in that a separate wavelength converting process according to a service is not required.

When the wavelength selecting apparatus 100 determines to select the synchronized wavelength, the wavelength selecting apparatus 100 stores a wavelength related parameter obtained during the downstream wavelength synchronization process (504), and terminates the selection of the wavelength. In the second exemplary embodiment of the present disclosure, the wavelength selecting apparatus 100 may first store the wavelength related parameter after the success of the downstream wavelength synchronization as illustrated in FIG. 8 (801). The stored wavelength related parameter may be used in a case where a wavelength changing command is received from the OLT 200. In this case, the wavelength selecting apparatus 100 may receive the PLOAM message after storing the wavelength related parameter (802), determine whether to select the synchronized wavelength based on the downstream wavelength information included in the received PLOAM message (803), and select the corresponding wavelength according to the determination result (804).

Figure 9:
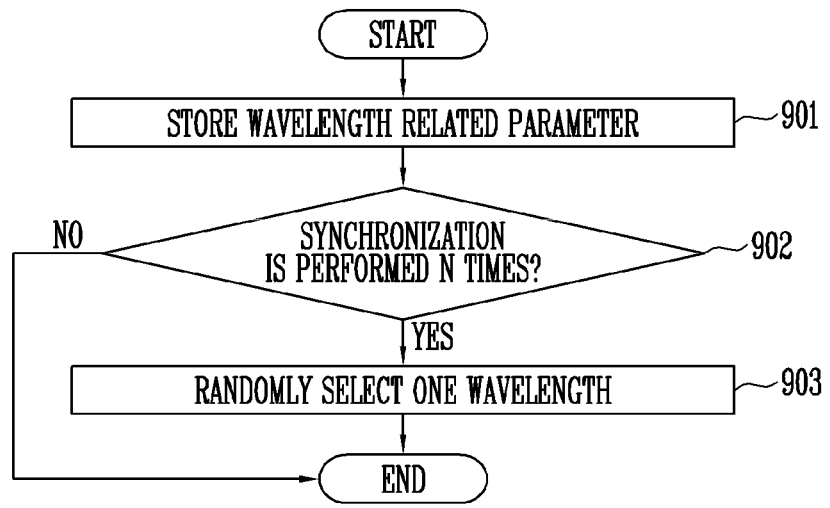
FIG. 9 is a flowchart illustrating a wavelength selecting method according to a third exemplary embodiment of the present disclosure.

FIG. 9 is a flowchart illustrating a wavelength selecting method according to a third exemplary embodiment of the present disclosure. In the third exemplary embodiment of the present disclosure, the wavelength selecting apparatus 100 selects a wavelength according to the random selection method.

The random selection method is a method of obtaining a wavelength related parameter for N downstream wavelengths, and randomly selecting one wavelength among the obtained N downstream wavelengths. Each of the CTs 210 to 240 may individually transmit a channel information PLOAM message including the wavelength (channel) related information (wavelength related parameter) used by each of the CTs 210 to 240, or transmit information about all of the wavelengths by transmitting a plurality of PLOAM messages. Accordingly, the wavelength selecting apparatus 100 may obtain each wavelength related parameter by performing the synchronization with all of the downstream wavelengths and then select a wavelength, or perform the synchronization with one predetermined wavelength, receive a plurality of channel information PLOAM messages from the synchronized wavelength and interpret the plurality of channel information PLOAM messages, and select a desired wavelength.

Referring to FIG. 9, after the downstream wavelength synchronization is succeeded in FIG. 4, the wavelength selecting apparatus 100 stores the obtained wavelength related parameter (901). Then, the wavelength selecting apparatus 100 determines whether the downstream wavelength synchronization (or including the wavelength related parameter obtaining operation) is performed N times (902). Whether the downstream wavelength synchronization (or including the wavelength related parameter obtaining operation) is performed N times may be determined based on the number of stored wavelength related parameters, or by using a separate parameter for counting the number of times of the downstream wavelength synchronization. According to the NG-PON2 standard, up to a maximum of eight downstream wavelengths may be used, so that N may be set to have a value from 1 to 8, and the value of N may be preset and stored in the wavelength selecting apparatus 100.

When the downstream wavelength synchronization is not performed N times, the wavelength selecting apparatus 100 may terminate the current wavelength selection, return the downstream wavelength synchronization and wavelength related parameter obtaining operation, and repeat the corresponding operation until the downstream wavelength synchronization is performed N times.

When the downstream wavelength synchronization is performed N times, the wavelength selecting apparatus 100 selects one predetermined wavelength among the N synchronized downstream wavelengths (903). The wavelength selecting apparatus 100 may select the one predetermined wavelength by a probability distribution according to the uniform distribution. When the one predetermined wavelength is selected by the probability distribution according to the uniform distribution, a probability in that the downstream wavelengths are uniformly distributed to the plurality of wavelength selecting apparatuses 100 is increased, so that it is possible to minimize a time taken for converting the wavelength and the number of times of converting the wavelength for the load balancing after the bring-up. In the aforementioned process, when the CT transmits the channel information PLOAM messages for all of the channel information, N may be 1, and the wavelength selecting apparatus may interpret the received channel information PLOAM messages, select one wavelength by the probability distribution according to the uniform distribution, and change the wavelength.

Figure 10:
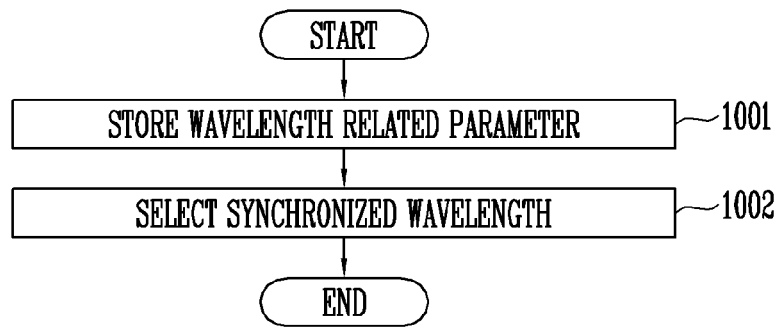
FIG. 10 is a flowchart illustrating a wavelength selecting method according to a fourth exemplary embodiment of the present disclosure.

FIG. 10 is a flowchart illustrating a wavelength selecting method according to a fourth exemplary embodiment of the present disclosure. In the fourth exemplary embodiment of the present disclosure, the wavelength selecting apparatus 100 selects a wavelength according to the early synchronization and change method.

The early synchronization and change method is a method of selecting (early synchronizing), by the wavelength selecting apparatus 100, an initially synchronized downstream wavelength, and terminating a wavelength related parameter obtaining operation in order to perform a rapid bring-up operation. Then, the wavelength used by the wavelength selecting apparatus 100 may be changed through the PLOAM message of the OLT 200 for the load balancing between the CTs 210 to 240.

Referring to FIG. 10, after the downstream wavelength synchronization is succeeded in FIG. 4, the wavelength selecting apparatus 100 stores the obtained wavelength related parameter (1001). Then, the wavelength selecting apparatus 100 may select to use the synchronized wavelength (1002). As described above, when the early synchronization with any one of the downstream wavelengths is completed, the early synchronization and change method terminates the wavelength selection operation by selecting the corresponding wavelength, and performs the bring-up at the selected wavelength.

As described above, the wavelength selection method and apparatus suggested in the present disclosure may minimize a wavelength selection time and the number of times of changing a wavelength.

The technical spirit of the present disclosure have been described according to the exemplary embodiment in detail, but the exemplary embodiment has described herein for purposes of illustration and does not limit the present disclosure. Further, those skilled in the art will appreciate that various exemplary embodiments may be made within the technical spirit of the present disclosure.

What is claimed is:
1. A method of selecting a wavelength by a wavelength selecting apparatus in a hybrid passive optical network system, the method comprising:
    performing synchronization with any one of a plurality of downstream wavelengths;
    when the synchronization is succeeded, determining whether to select the synchronized downstream wavelength for a registration to an optical line terminal; and
    when it is determined to select the synchronized downstream wavelength, performing the registration to the optical line terminal through the synchronized downstream wavelength, wherein the determining whether to select the synchronized downstream wavelength for the registration to the optical line terminal includes:
receiving a profile Physical Layer Operation, Administration and Maintenance (PLOAM) message from the optical line terminal;
determining whether to select the synchronized downstream wavelength based on downstream wavelength information included in the PLOAM message; and
when it is determined to select the synchronized downstream wavelength, storing a wavelength related parameter obtained during the synchronization,
wherein the downstream wavelength information is included in a specific field of the PLOAM message, and
wherein the determining whether to select the synchronized downstream wavelength further includes when a downstream wavelength ID obtained during the synchronization is the same as a value of the specific field, determining to select the synchronized downstream wavelength.

2. The method of claim 1, wherein
the determining whether to select the synchronized downstream wavelength further includes when the value of the specific field is a value corresponding to a service, which the wavelength selecting apparatus desires to use, determining to select the synchronized downstream wavelength.

3. The method of claim 1, wherein the determining whether to select the synchronized downstream wavelength for the registration to the optical line terminal further includes:
determining whether the synchronization is performed by a predetermined number of times; and
when the synchronization is performed by the predetermined number of times, randomly selecting any one of the plurality of downstream wavelengths according to a uniform distribution probability distribution.

4. The method of claim 1, wherein the determining whether to select the synchronized downstream wavelength for the registration to the optical line terminal further includes:
when the synchronization is succeeded, storing the wavelength related parameter obtained during the synchronization; and
selecting the synchronized wavelength.

5. An apparatus for selecting a wavelength operated in a hybrid passive optical network system, the apparatus comprising:
a communication unit configured to perform communication with an optical line terminal;
a control unit configured to control so as to perform synchronization with any one of a plurality of downstream wavelengths, determine whether to select the synchronized downstream wavelength for a registration to the optical line terminal when the synchronization is succeeded, and perform the registration to the optical line terminal through the synchronized downstream wavelength when it is determined to select the synchronized downstream wavelength; and
a storage unit configured to store a wavelength related parameter obtained during the synchronization,
wherein the communication unit receives a profile Physical Layer Operation, Administration and Maintenance (PLOAM) message from the optical line terminal,
wherein the control unit determines whether to select the synchronized downstream wavelength based on downstream wavelength information included in the PLOAM message,
wherein the downstream wavelength information is included in a specific field of the PLOAM message, and
wherein when a value of the specific field is a value corresponding to a service, which the wavelength selecting apparatus desires to use, the control unit determines to select the synchronized downstream wavelength.

6. The apparatus of claim 5, wherein the communication unit includes a wavelength tunable optical transceiver performing the communication according to a modulation and transception scheme corresponding to a downstream wavelength selected by the control unit, and
wherein the control unit includes:
an optical transceiver control unit configured to control the wavelength tunable optical transceiver; and
a wavelength selection determining unit configured to select any one of the plurality of downstream wavelengths according to a predetermined method.

7. The apparatus of claim 5, wherein when it is determined to select the synchronized downstream wavelength, the storage unit stores the wavelength related parameter obtained during the synchronization.

8. The apparatus of claim 5, wherein
when a downstream wavelength ID obtained during the synchronization is the same as the value of the specific field, the control unit determines to select the synchronized downstream wavelength.

9. The apparatus of claim 5, wherein the control unit determines whether the synchronization is performed by a predetermined number of times, and randomly selects any one of the plurality of downstream wavelengths according to a uniform distribution probability distribution when the synchronization is performed by the predetermined number of times.

10. The apparatus of claim 5, wherein when the synchronization is succeeded, the storage unit stores the wavelength related parameter obtained during the synchronization, and the control unit selects the synchronized wavelength.

11. A method of selecting a wavelength by a wavelength selecting apparatus in a hybrid passive optical network system, the method comprising:
performing synchronization with any one of a plurality of downstream wavelengths;
when the synchronization is succeeded, determining whether to select the synchronized downstream wavelength for a registration to an optical line terminal; and
when it is determined to select the synchronized downstream wavelength, performing the registration to the optical line terminal through the synchronized downstream wavelength,
wherein the determining whether to select the synchronized downstream wavelength for the registration to the optical line terminal includes:
storing a wavelength related parameter obtained during the synchronization;
determining whether the synchronization is performed by a predetermined number of times; and
when the synchronization is performed by the predetermined number of times, randomly selecting any one of the plurality of downstream wavelengths according to a uniform distribution probability distribution.

* * * * *